United States Patent
Schuh (10) Patent No.: US 11,372,716 B2
(45) Date of Patent: Jun. 28, 2022

(54) DETECTING SPECIAL HANDLING METADATA USING ADDRESS VERIFICATION

(71) Applicant: Micron Technology, Inc., Boise, ID (US)

(72) Inventor: Karl D. Schuh, Santa Cruz, CA (US)

(73) Assignee: MICRON TECHNOLOGY, INC., Boise, ID (US)

(*) Notice: Subject to any disclaimer, the term of this patent is extended or adjusted under 35 U.S.C. 154(b) by 9 days.

(21) Appl. No.: 16/941,022

(22) Filed: Jul. 28, 2020

(65) Prior Publication Data

US 2022/0035700 A1 Feb. 3, 2022

(51) Int. Cl.
| | |
|---|---|
| *G11C 29/00* | (2006.01) |
| *G06F 11/10* | (2006.01) |
| *G06F 11/07* | (2006.01) |
| *G06F 12/14* | (2006.01) |
| *G06F 12/0871* | (2016.01) |
| *G06F 11/30* | (2006.01) |

(52) U.S. Cl.
CPC ...... *G06F 11/1068* (2013.01); *G06F 11/0772* (2013.01); *G06F 11/3037* (2013.01); *G06F 12/0871* (2013.01); *G06F 12/1408* (2013.01); *G06F 2212/7207* (2013.01)

(58) Field of Classification Search
CPC ............ G06F 11/1068; G06F 11/0772; G06F 11/3037; G06F 12/1408; G06F 2212/7207
See application file for complete search history.

(56) References Cited

U.S. PATENT DOCUMENTS

| | | | |
|---|---|---|---|
| 10,817,415 B2* | 10/2020 | Zhou | G06F 12/0253 |
| 2009/0172262 A1* | 7/2009 | Olbrich | G06F 13/28 |
| | | | 711/103 |
| 2014/0244901 A1* | 8/2014 | Panda | G06F 12/0246 |
| | | | 711/103 |
| 2017/0024161 A1* | 1/2017 | Katiyar | G06F 3/0689 |
| 2017/0262387 A1* | 9/2017 | Sell | G06F 12/1441 |
| 2019/0102291 A1* | 4/2019 | Zhou | G06F 3/0659 |

* cited by examiner

*Primary Examiner* — Samir W Rizk
(74) *Attorney, Agent, or Firm* — Nicholson De Vos Webster & Elliott LLP

(57) ABSTRACT

Exemplary methods, apparatuses, and systems include receiving a read request directed to an addressable unit of memory. The read request includes an address for the addressable unit and the addressable unit includes a metadata portion. A mismatch between one or more bits of the address in the read request and a corresponding one or more bits of an address verification value in the metadata portion of the addressable unit is detected. A position of each of the one or more bits that did not match is determined to be an indication of special handling for the addressable unit of memory. In response to the indication of special handling, special handling metadata for the addressable unit of memory is read and the read request is processed according to the special handling metadata.

20 Claims, 6 Drawing Sheets

DETECTING SPECIAL HANDLING METADATA USING ADDRESS VERIFICATION

TECHNICAL FIELD

The present disclosure generally relates to managing metadata in a memory subsystem, and more specifically, relates to detecting special handling metadata using address verification.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to managing metadata in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Typical memory subsystems can contain host data that are subject to special handling. Often this occurs when the data size as managed by a host system does not match the data size as managed by the media of the memory subsystem. For example, a memory subsystem with a 4-kilobyte media data size will mismatch with a host having a data size of 512 bytes. The memory subsystem resolves this mismatch by storing eight host data structures (e.g., 512-byte sectors) within one media data structure (e.g., a 4-kilobyte translation unit or transfer unit (TU)). A typical memory subsystem media data structure stores metadata along with each media data structure. This metadata includes a copy of the logical block address (LBA) mapped to the media data structure as an address verification value as well as special handling indicators for the host data structures stored therein.

A host data structure can be subject to special handling, for example, when the host data structure has been deallocated, been subject to a prior ECC error, or remains unwritten. In such scenarios, while the host data structure is stored in a media data structure that can otherwise contain host data structures that do not require special handling, the presence of a single host data structure subject to special handling means the memory subsystem cannot simply read and return the contents of the entire media data structure to the host (or another operation that would return at least that host data structure). Managing each host data structure separately for the possibility of special handling increases the amount of metadata that the memory subsystem tracks and processes.

Conventional memory subsystems verify the LBA (e.g., a 4-byte address value) as a data integrity check. Because the memory system performs this comparison for every media data structure read, the comparison of the LBA in the read request with the address verification value stored in metadata is typically preformed using an address verifier in the hardware data path. In contrast, conventional memory subsystems check other metadata (e.g., 12 bytes of special handling indicators) with firmware. As a result, special handling metadata consumes space within the memory subsystem that cannot be used for storing other metadata or host data. Additionally, processing each read request for special handling includes examining the metadata (e.g., with firmware), which can significantly contribute to read latency.

Aspects of the present disclosure address the above and other deficiencies by detecting special handling metadata using the existing address verification process. When creating the metadata for a host data structure, embodiments flip one or more bits of the LBA to create a masked LBA (i.e., the address verification value) as an indication of special handling for the host data structure. When the memory subsystem reads the host data structure, the address verifier will indicate there is an error in the metadata associated with the host data structure when the LBA and masked LBA do not match. In response to the mismatch, the memory subsystem can determine if a bitmap for special handling metadata indicators matches the bit flip pattern of the LBA-masked LBA mismatch (i.e., the positions of bits that do not match). If the one or more positions within the bitmap match the bit flip pattern of the LBA-masked LBA mismatch, the memory subsystem has determined that a host data structure is subject to special handling. As a result of using an existing hardware check of the LBA, embodiments reduce instances of the firmware processing metadata associated with a host data structure to look for special handling indicators and, in turn, decrease read operation latency for media data structures that do not include host data structures that are subject to special handling.

Additionally, embodiments can map bit flip patterns in the LBA-masked LBA mismatches to locations of special handling metadata or instructions. For example, different patterns of flipped bits can be associated with different host data structures. The location of flipped bits in the masked LBA can, therefore, be mapped to a location of the one or more host data structures (e.g. sectors) within the media data structure that are subject to special handling. Because host data structures that are subject to special handling do not store data that is simply read and returned, special handling metadata (e.g., confirming special handling or identifying a special handling type) and any special handling details can be stored in the mapped host data structures that are subject to special handling. As a result of storing special handling metadata in the unused host data structures, the corresponding space in the metadata portion of each media data structure can be freed for other uses (e.g., up to 12 bytes per media data structure following the example above), such as an increase in error-correcting code metadata, an increase in addressable space (e.g., giving an additional byte to the LBA), and/or a reduction in page size.

Figure 1:
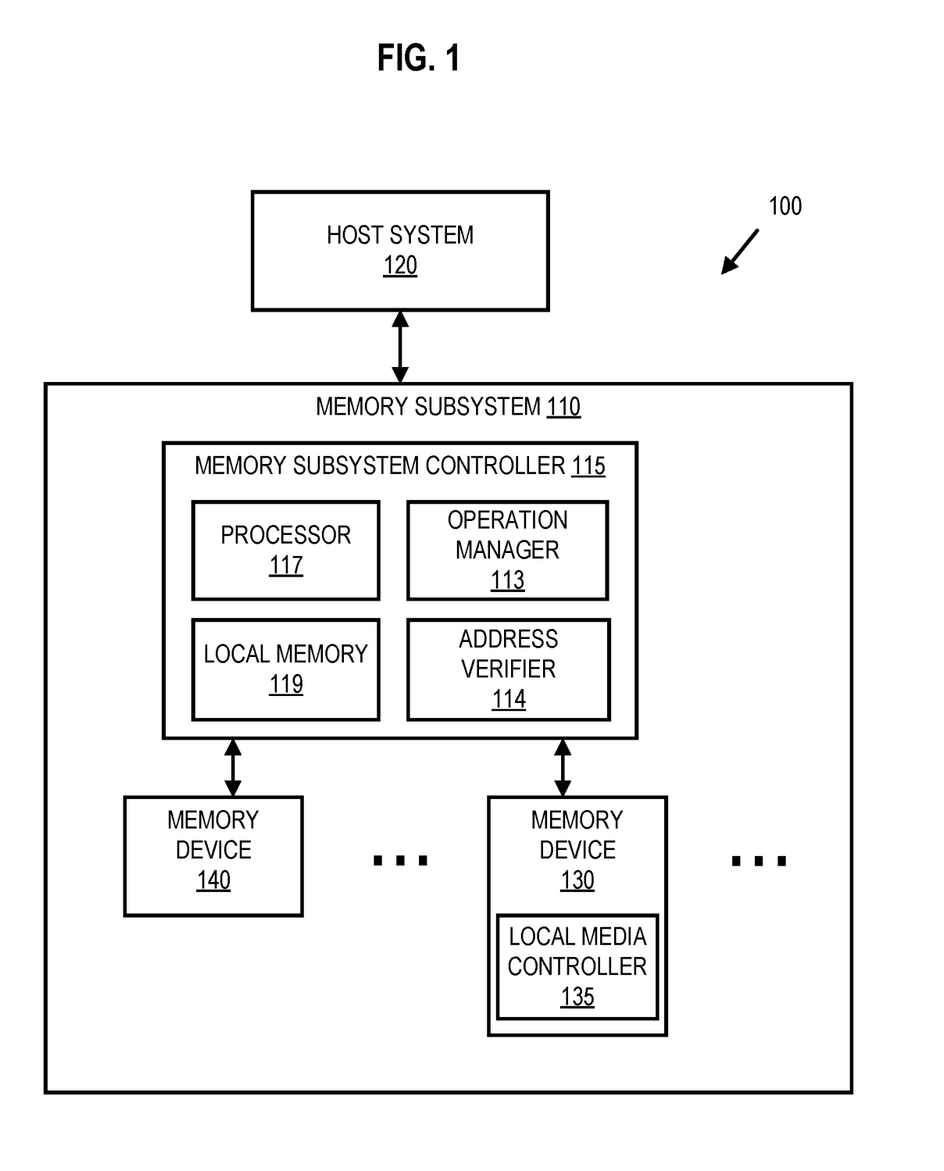
FIG. 1 illustrates an example computing system that includes a memory subsystem in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory device(s) 130 and/or the memory device(s) 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes an operation manager 113 that can detect special handling metadata using address verification. In some embodiments, the controller 115 includes at least a portion of the operation manager 113. For example, the controller 115 can include a processor 117 (processing device) configured to execute instructions stored in local memory 119 for performing the operations described herein. In some embodiments, the operation manager 113 is part of the host system 110, an application, or an operating system.

The memory subsystem 110 further includes an address verifier 114 to compare an address included in a read operation/request with an address verification value stored in metadata associated with the corresponding memory location in a memory device 130. In some embodiments, the address verifier 114 is implemented as a portion of the hardware data path used in reading data from a memory device 130. For example, the memory subsystem 110 can include a digital comparator to serve as the address verifier 114. The comparison of the read operation address with the address verification value is performed faster by hardware than by firmware/software.

The operation manager 113 can flip one or more bits of the LBA to create a masked LBA (i.e., the address verification value) as an indication of special handling for the host data structure. When the address verifier 114 flags an LBA mismatch error, the operation manager 113 can determine if the mismatch is the result of a bit flip pattern that indicates special handling. In some embodiments, the operation manager 113 uses the bit flip pattern to locate special handling metadata, instructions, or other information related to the special handling. Further details with regards to the operations of the operation manager 113 are described below.

Figure 2:
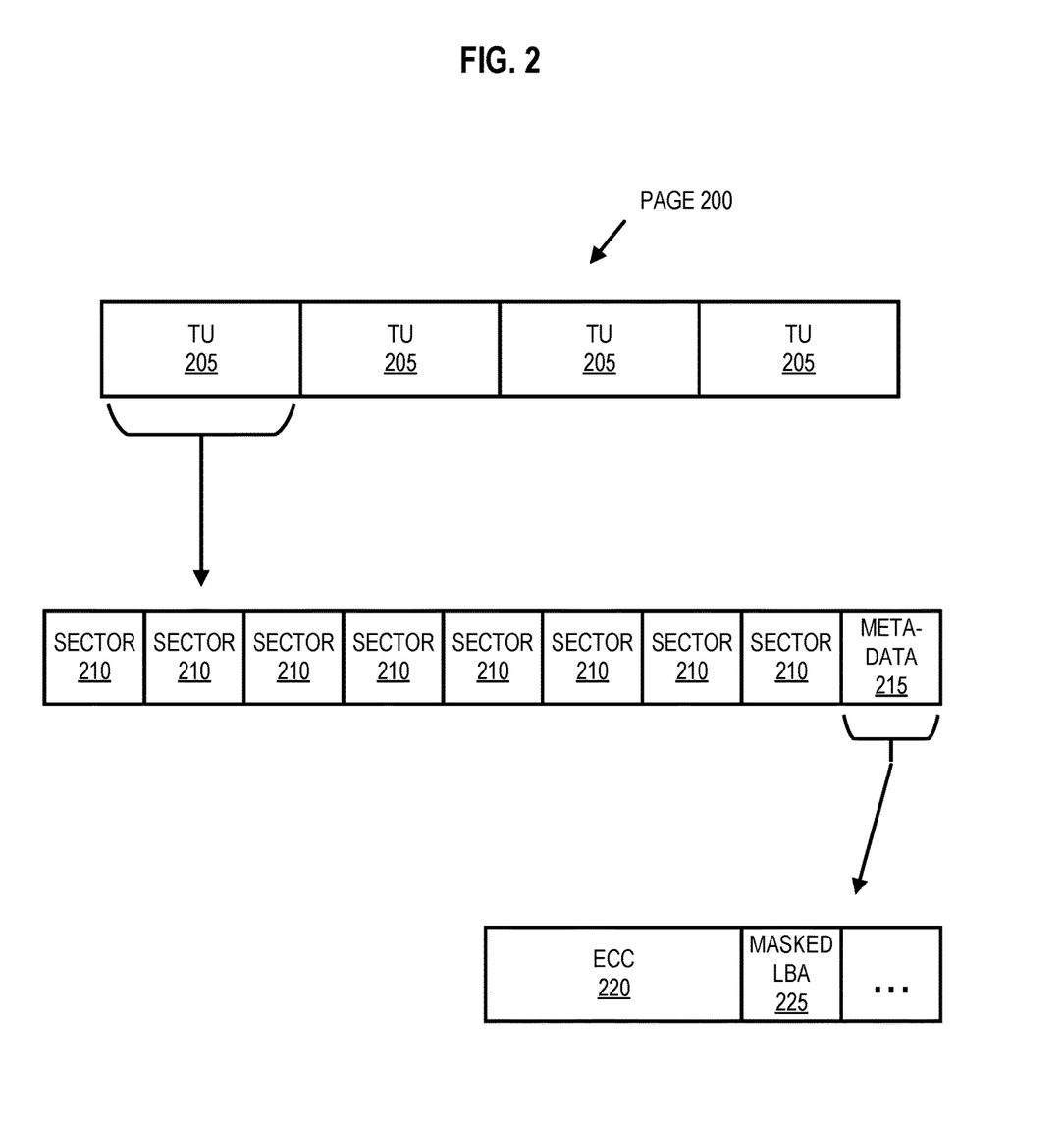
FIG. 2 illustrates an example of the organization of data and metadata in accordance with some embodiments of the present disclosure.

FIG. 2 illustrates an example of the organization of data and metadata in accordance with some embodiments of the present disclosure. The memory subsystem 110 stores data, e.g., within memory devices 130, in a hierarchical organization structure. A page 200 can refer to physical unit of data written to memory. In some embodiments, a page 200 represents the smallest writeable unit of memory within a memory device 130.

The illustrated page 200 is divided into multiple individually addressable units, TU's 205. Each TU 205 represents an addressable media data structure. As one example, a TU 205 can store approximately 4 kilobytes of data and corresponding metadata.

When a host data structure is smaller than a media data structure, the memory subsystem 110 can store multiple host media structures within a single media data structure. For example, each TU 205 is divided into multiple sectors 210. Continuing the example above, a TU 205 can include eight 512-byte sectors 210. Sectors 210 store host data, e.g., when not subject to special handling.

Each TU 205 further includes a metadata portion 215. The metadata 215 can include error-correcting code (ECC) data 220 and a masked LBA 225. The masked LBA 225 serves as an address verification value. For example, when one or more sectors 210 within a TU 205 are subject to special handling, the operation manager 113 can flip one or more bits of the address corresponding to the TU 205. The resulting masked LBA 225 is stored within the metadata 215 as an indication of special handling for the corresponding one or more sectors 210. The creation and utilization of masked LBA's 225 is described in additional detail with reference to FIG. 3-D.

In one embodiment, the metadata 215 further includes special handling metadata. For example, special handling metadata can identify whether a sector 210 has been deallocated, been subject to a prior ECC error, remains unwritten, or is otherwise subject to special handling. Each scenario can trigger, e.g., in response to a read request, a different type of special handling procedure for the memory subsystem 110. In another embodiment, the memory subsystem 110 stores the special handling metadata within the corresponding sector 210 that is subject to special handling. As described further with reference to FIG. 3-D, the pattern of flipped bits in the masked LBA 225 can indicate which sector(s) 210 are subject to special handling and, accordingly, where to find the special handling metadata.

Figure 3:
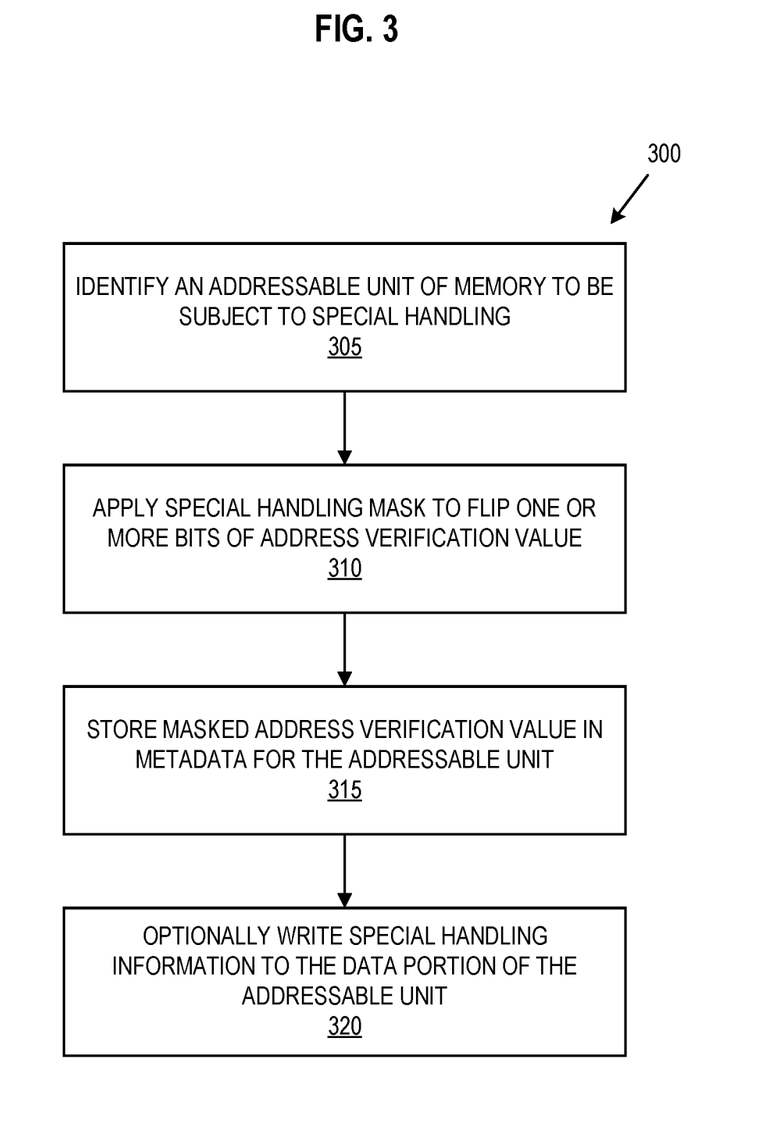
FIG. 3 is a flow diagram of an example method to write a masked address verification value to indicate special handling of an addressable unit in accordance with some embodiments of the present disclosure.

FIG. 3 is a flow diagram of an example method 300 to write a masked address verification value to indicate special handling of an addressable unit in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the operation manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device identifies an addressable unit of memory to be subject to special handling. For example, the processing device identifies sectors 210 that have been deallocated, been subject to a prior ECC error, or remain unwritten as being subject to special handling. In one embodiment, the processing device identifies unwritten sectors 210 subject to special handling in response to an initial power-on, creation of an address translation table, or similar event. In one embodiment, the processing device identifies addressable units subject to special handling in response to a trigger event, e.g., when a sector 210 triggers an ECC error or is deallocated.

At operation 310, the processing device applies a special handling bitmap mask to flip one or more bits of an address verification value for the addressable unit of memory that is subject to special handling. For example, the processing device can use a mask or other bitmap pattern to selectively flip the value of one or more bits within the copy of the LBA used as an address verification value to create a masked address verification value (e.g., masked LBA 225). In one embodiment, the mask is a sequence of binary values in which 0's represent bits that will remain and 1's represent bits to be flipped. The processing device can exclusive-OR (XOR) this mask with the LBA to flip the corresponding bits and create the masked LBA value.

In one embodiment, there are multiple masks and the processing device selects a mask based upon the type of special handling and/or location of the sector subject to special handling within the TU. In an embodiment including N sectors within a TU, the processing device can use a mask to flip one or more bits in any of N bit positions to indicate which of the N sectors (alone or in combination) are subject to special handling. Similarly, the processing device can use a mask to flip one or more bits in any of $\log_2$ N bit positions to indicate which single sector within the N sectors is subject to special handling. The special handling information for that sector (e.g., as stored within the data portion of that sector) can include an indication of any other sectors within the TU that are also subject to special handling. Other embodiments use different numbers of flipped bits. For example, the processing device can flip multiple bits per sector subject to special handling to avoid false indications of special handling due to bit errors.

At operation 315, the processing device stores the masked address verification value in the metadata for the addressable unit of memory. For example, when writing a TU 205 as a part of a page 200 to a memory device 130, the processing device writes the masked address verification value within metadata 215. In one embodiment, the processing device also stores special handling metadata along with the masked address verification value in the metadata portion of the addressable unit of memory. For example, when the masked address verification value only indicates the presence of a sector subject to special handling (e.g., but not the location of that sector or the type of special handling), the processing device can include an indicator of the location of the sector in question and/or the type of special handling in the metadata 215 portion of the TU 205.

At operation 320, the processing device optionally writes special handling metadata and/or information to the data portion of the addressable unit that is subject to special handling. For example, in addition to or instead of writing special handling metadata to the metadata 215 portion of the TU 205, the processing device stores special handling metadata and/or other information in the sector 210 subject to special handling. The processing device can write an indicator of special handling to the sector 210 (e.g., to confirm that the sector 210 is subject to special handling), an indicator of the type of special handling, instructions or information used in processing the special handling, etc. In one embodiment, the processing device writes an error message or code to deliver to a host device as special handling information.

Figure 4:
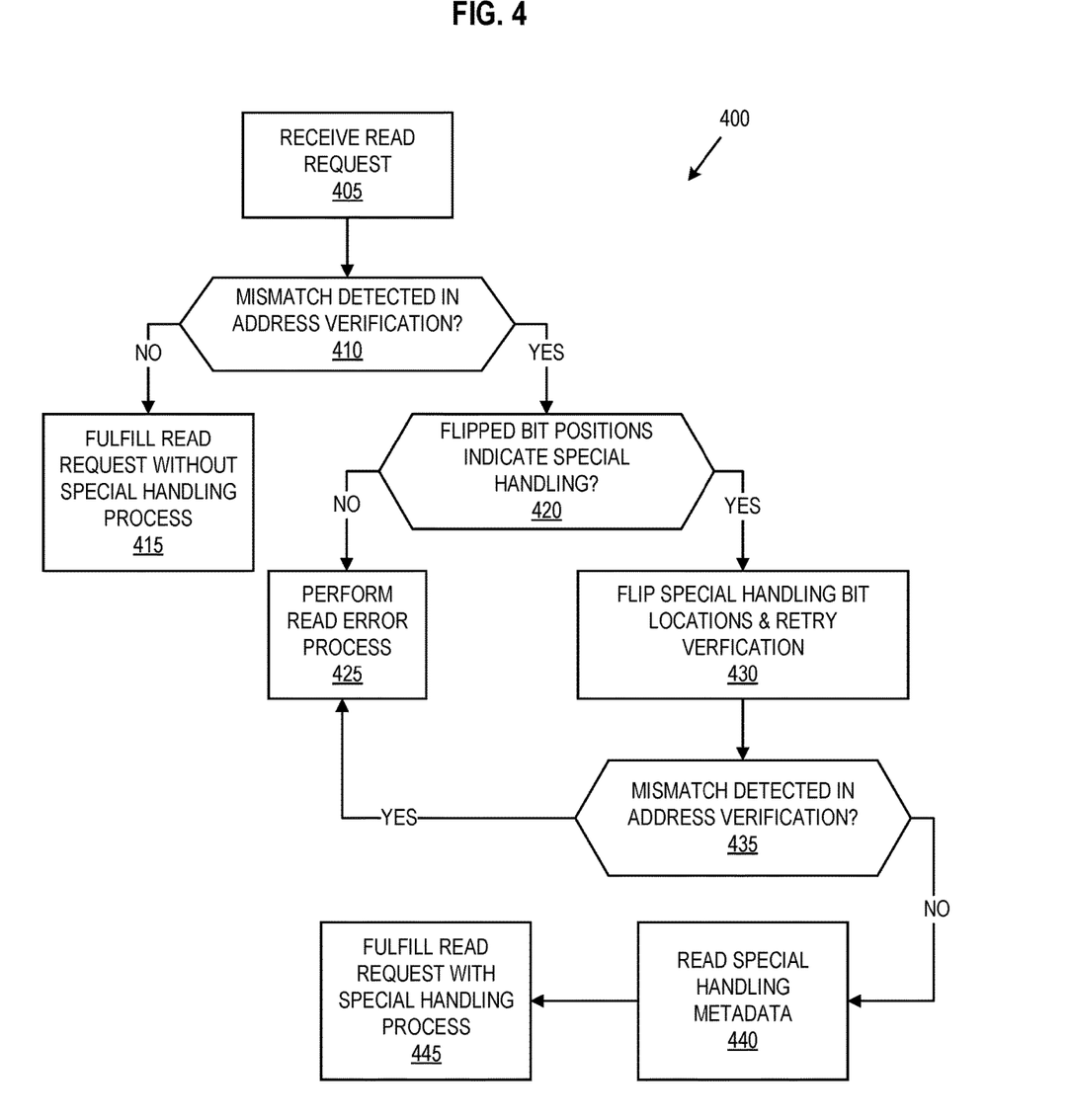
FIG. 4 is a flow diagram of an example method to detect special handling metadata using address verification in accordance with some embodiments of the present disclosure.

FIG. 4 is a flow diagram of an example method 400 to detect special handling metadata using address verification in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the operation manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives a read request including an address for the addressable unit of memory. For example, the processing device can receive a read request from a host system 120, the read request including an LBA that maps to a TU 205 within a memory device 130.

At operation 410, the processing device determines whether the LBA and address verification value match or not. As described above, the processing device can take advantage of a hardware address verifier 114 in the read path to obtain a result of this comparison. In one embodiment, the processing device receives a simple indication of match or mismatch, such as a single bit, from the address verifier 114. In another embodiment, the processing device receives an output from the address verifier 114 that indicates each bit position in the address verification value that does not match with the LBA. For example, the address verifier 114 can output the result of an XOR operation performed on both the address verification value and the LBA, the result including bits set to zero for bit positions that match and set to one for bit positions that do not match.

If the LBA and address verification value match, at operation 415, the processing device fulfills the read request without any special handling. For example, the processing device can read the TU 205 and return the data of one or more of the sectors 210 within that TU 205 to the host system 120. In one embodiment, the processing device triggers a direct memory access (DMA) operation to fulfill the read request.

If the LBA and address verification value do not match, at operation 420, the processing device determines if the bits that resulted in the mismatch are in bit positions that correspond to a special handling bitmap mask. If the address verifier 114 provides an indication of mismatch that includes bit positions that do not match, the processing device can compare the mismatched bit positions to one or more bitmap masks. If the address verifier 114 does not provide an indication that includes mismatching bit positions, the processing device can compare the LBA and address verification, e.g., using an XOR operation as described above. In one embodiment, the processing device compares the mismatching bit positions with one or more bitmap masks using an XOR operation for each comparison. A match between flipped bits in the address verification value and a bitmap mask indicates that the TU 205 includes one or more sectors 210 that are subject to special handling.

If the mismatching bit positions do not match a special handling bitmap mask, at operation 425, the processing device performs a read error process. The lack of a matching mask indicates that, instead of special handling, the mismatch has resulted from a corruption of the metadata for the TU 205, an error in an address translation table, or another error.

If the mismatching bit positions match a special handling bitmap mask, at operation 430, the processing device flips the mismatching bits to restore the address to an unmasked state. For example, the processing device can perform an XOR operation between the address verification value and the matching special handling bitmap mask to return the address to an original state. The processing device can then request that the address verifier 114 retry the comparison between the address of the received read request and the restored address verification value to, e.g., enable a read of the memory device 130.

At operation 435, the processing device determines if the address of the received read request and the restored address verification value now result in a match. If the address verifier 114 indicates another mismatch, the processing device performs the read error process at operation 425.

If the address verifier 114 indicates a match between the address of the received read request and the restored address verification value (or if the processing device bypasses operations 430-435), at operation 440, the processing device reads the special handling metadata for the corresponding one or more sectors 210. As described above, the special handling metadata can confirm which sector(s) are subject to special handling, indicate what type of special handling to apply, or other information about the special handling. In one embodiment, the special handling metadata is stored in the metadata portion 215 of the TU 205. In such an embodiment, the processing device parses the metadata 215 and reads the special handling metadata stored therein. In another embodiment, the special handling metadata is stored within one or more sectors 210 and the matching special handling bitmap mask maps to or otherwise indicates which sectors 210 are subject to special handling and, accordingly, store special handling metadata. Additionally, sectors 210 subject to special handling do not store host data and can instead store special handling instructions or other information to enable the processing device to fulfill the read request according to the corresponding special handling.

In one embodiment, the special handling metadata is encrypted or otherwise protected to ensure the integrity of the special handling process. In such an embodiment, the processing device decrypts the special handling metadata as a part of the process of reading the special handling metadata.

At operation 445, the processing device fulfills the read request with the corresponding special handling process. For example, the processing device can deliver an error message to the host system 120, such as an error message stored in the corresponding sector 210, or trigger another response to the read request directed to a sector that is subject to special handling.

Figure 5:
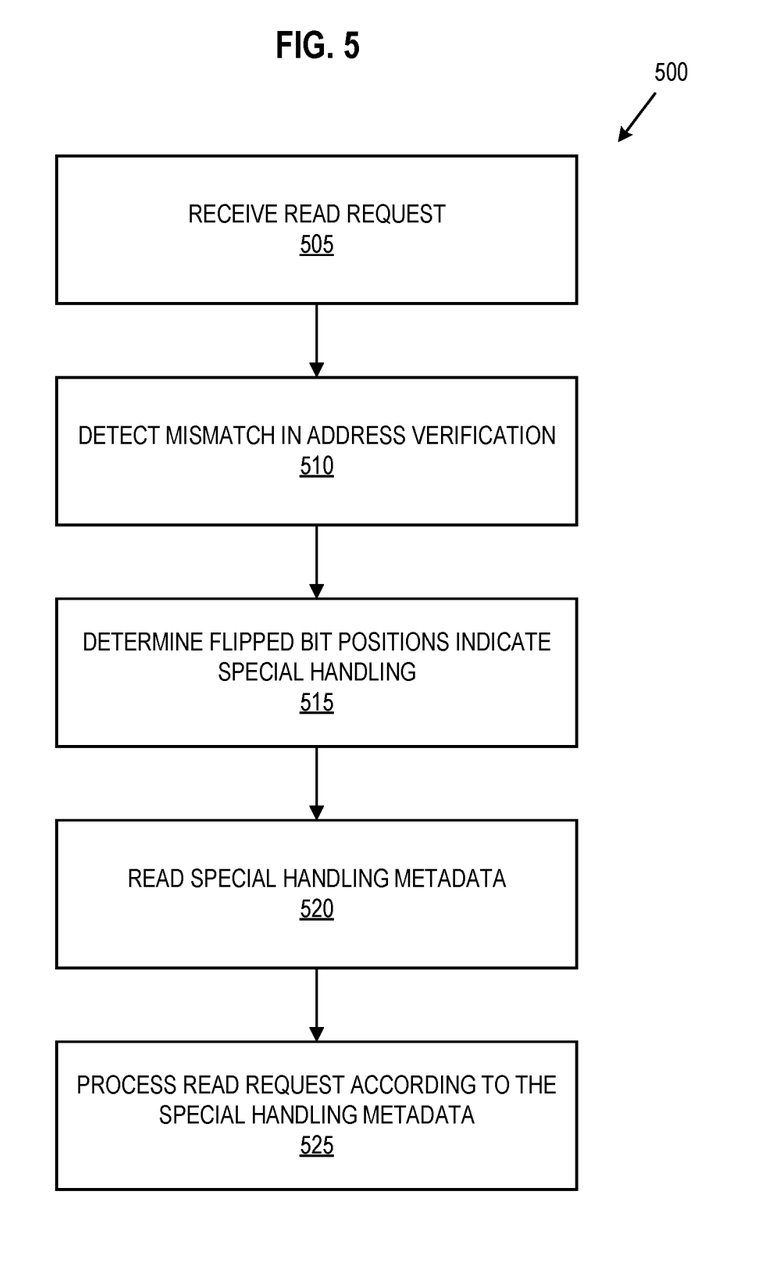
FIG. 5 is a flow diagram of another example method to detect special handling metadata using address verification in accordance with some embodiments of the present disclosure.

FIG. 5 is a flow diagram of another example method 500 to detect special handling metadata using address verification in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the operation manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device receives a read request including an address for the addressable unit of memory. As described with reference to operation 405 above, the processing device can receive a read request from a host system 120 and the read request includes an LBA that maps to a TU 205 within a memory device 130.

At operation 510, the processing device detects a mismatch between the address in the read request and the corresponding address verification value stored in the metadata portion of the addressable unit of memory. As described above with reference to operation 410, the processing device can utilize the address verifier 114 to detect the mismatch.

At operation 515, the processing device determines the bit positions of flipped/mismatching bits between the address and the address verification value indicate the addressable unit of memory is subject to special handling. As described above with reference to operation 420, the processing device can use an XOR or similar comparison operation to determine that a special handling bitmap mask matches the pattern of mismatching bits in the address verification value.

At operation 520, the processing device reads the special handling metadata in response to detecting the indication of special handling. As described above with reference to operation 440, the processing device can read special handling metadata from the metadata portion 215 of the TU 205 or from the sector 210 subject to special handling.

At operation 525, the processing device processes the read request according to the special handling metadata. As described above with reference to operation 445, the processing device can deliver an error message to the host system 120, such as an error message stored in the corresponding sector 210, or trigger another response to the read request directed to a sector that is subject to special handling.

Figure 6:
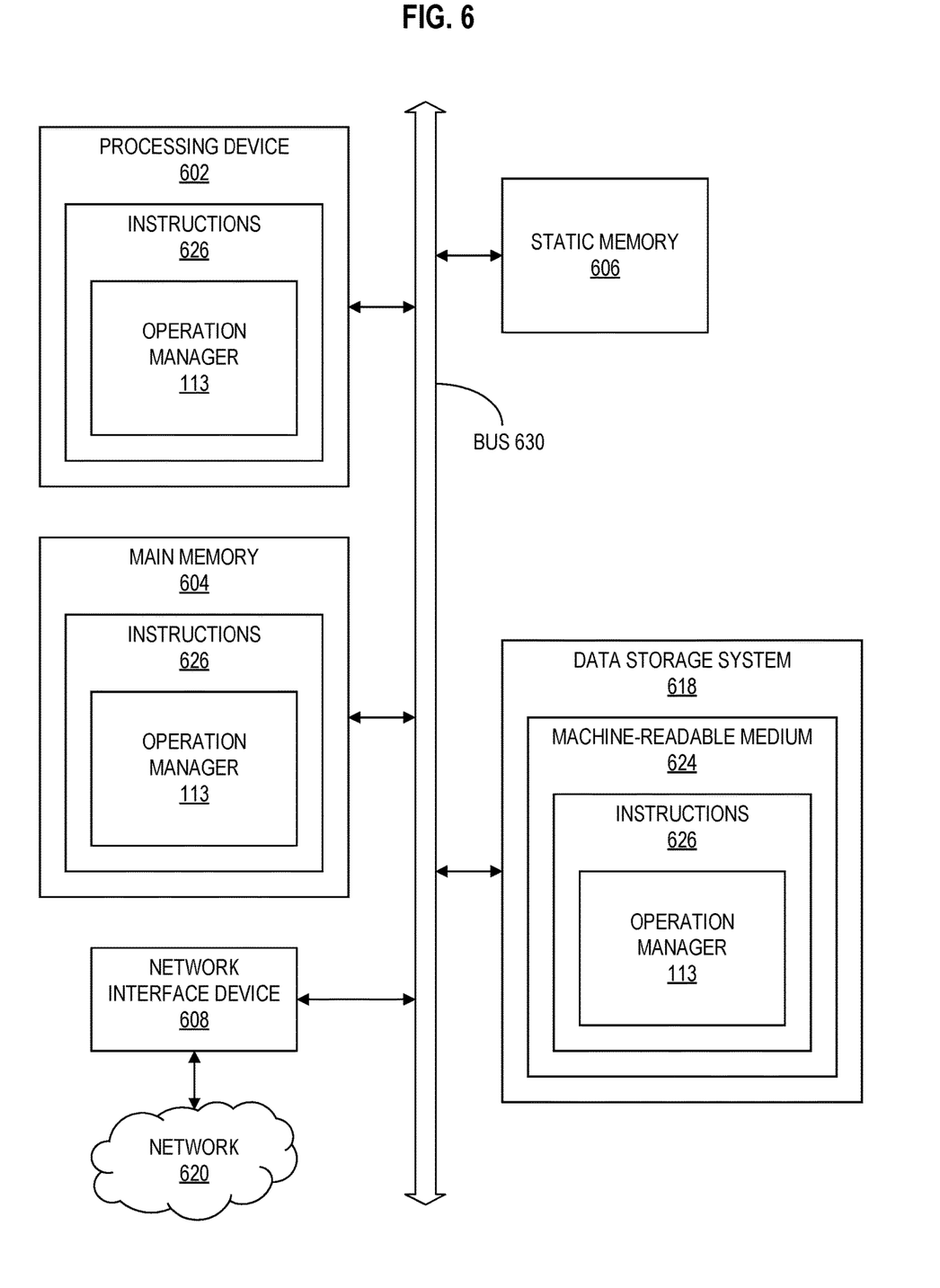
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the operation manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to an operation manager (e.g., the operation manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300, 400, and 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving a read request directed to an addressable unit of memory, wherein the read request includes an address for the addressable unit and the addressable unit includes a metadata portion;
detecting a mismatch between one or more bits of the address in the read request and a corresponding one or more bits of an address verification value, wherein the address verification value is a masked address of the addressable unit in the read request;
determining that a position of each of the one or more bits that did not match is an indication of special handling for the addressable unit of memory; and
in response to the indication of special handling:
reading special handling metadata for the addressable unit of memory, and
processing the read request according to the special handling metadata.

2. The method of claim 1, wherein the metadata portion of the addressable unit includes the special handling metadata.

3. The method of claim 1, further comprising:
mapping the position of the one or more mismatching bits to a portion of the addressable unit of memory, wherein the special handling metadata is stored in the portion of the addressable unit.

4. The method of claim 3, wherein the portion of the addressable unit includes, in lieu of host data, the special handling metadata and additional information for processing the read request according to the special handling metadata.

5. The method of claim 4, further comprising:
decrypting the special handling metadata, wherein the special handling metadata is encrypted to ensure that the portion of the addressable unit is subject to special handling.

6. The method of claim 4, wherein the additional information includes instructions to be executed in the special handling of the addressable unit of memory.

7. The method of claim 1, wherein the special handling indicates at least a portion of the addressable unit of memory (1) was deallocated, (2) was subject to a prior error correction failure, or (3) remains unwritten.

8. A non-transitory computer-readable storage medium comprising instructions that, when executed by a processing device, cause the processing device to:
receive a read request directed to an addressable unit of memory, wherein the read request includes an address for the addressable unit and the addressable unit includes a metadata portion;
detect a mismatch between one or more bits of the address in the read request and a corresponding one or more bits of an address verification value, wherein the address verification value is a masked address of the addressable unit in the read request;
determine that a position of each of the one or more bits that did not match is an indication of special handling for the addressable unit of memory; and
in response to the indication of special handling:
read special handling metadata for the addressable unit of memory, and
process the read request according to the special handling metadata.

9. The non-transitory computer-readable storage medium of claim 8, wherein the metadata portion of the addressable unit includes the special handling metadata.

10. The non-transitory computer-readable storage medium of claim 8, wherein the processing device is further to:
map the position of the one or more mismatching bits to a portion of the addressable unit of memory, wherein the special handling metadata is stored in the portion of the addressable unit.

11. The non-transitory computer-readable storage medium of claim 10, wherein the portion of the addressable unit includes, in lieu of host data, the special handling metadata and additional information for processing the read request according to the special handling metadata.

12. The non-transitory computer-readable storage medium of claim 11, wherein the processing device is further to:
decrypt the special handling metadata, wherein the special handling metadata is encrypted to ensure that the portion of the addressable unit is subject to special handling.

13. The non-transitory computer-readable storage medium of claim 11, wherein the additional information includes instructions to be executed in the special handling of the addressable unit of memory.

14. The non-transitory computer-readable storage medium of claim 8, wherein the special handling indicates at least a portion of the addressable unit of memory (1) was deallocated, (2) was subject to a prior error correction failure, or (3) remains unwritten.

15. A system comprising:
a memory device; and
a processing device, operatively coupled with the memory device, to:
receive a read request directed to an addressable unit of memory, wherein the read request includes an address for the addressable unit and the addressable unit includes a metadata portion;
detect a mismatch between one or more bits of the address in the read request and a corresponding one or more bits of an address verification value, wherein the address verification value is a masked address of the addressable unit in the read request;
determine that a position of each of the one or more bits that did not match is an indication of special handling for the addressable unit of memory, wherein the special handling indicates at least a portion of the addressable unit of memory (1) was deallocated, (2) was subject to a prior error correction failure, or (3) remains unwritten; and
in response to the indication of special handling:
read special handling metadata for the addressable unit of memory, and
process the read request according to the special handling metadata.

16. The system of claim 15, wherein the metadata portion of the addressable unit includes the special handling metadata.

17. The system of claim 15, wherein the processing device is further to:
map the position of the one or more mismatching bits to a portion of the addressable unit of memory, wherein the special handling metadata is stored in the portion of the addressable unit.

18. The system of claim 17, wherein the portion of the addressable unit includes, in lieu of host data, the special handling metadata and additional information for processing the read request according to the special handling metadata.

19. The system of claim 18, wherein the processing device is further to:
decrypt the special handling metadata, wherein the special handling metadata is encrypted to ensure that the portion of the addressable unit is subject to special handling.

20. The system of claim 18, wherein the additional information includes instructions to be executed in the special handling of the addressable unit of memory.

* * * * *